Figure 1:
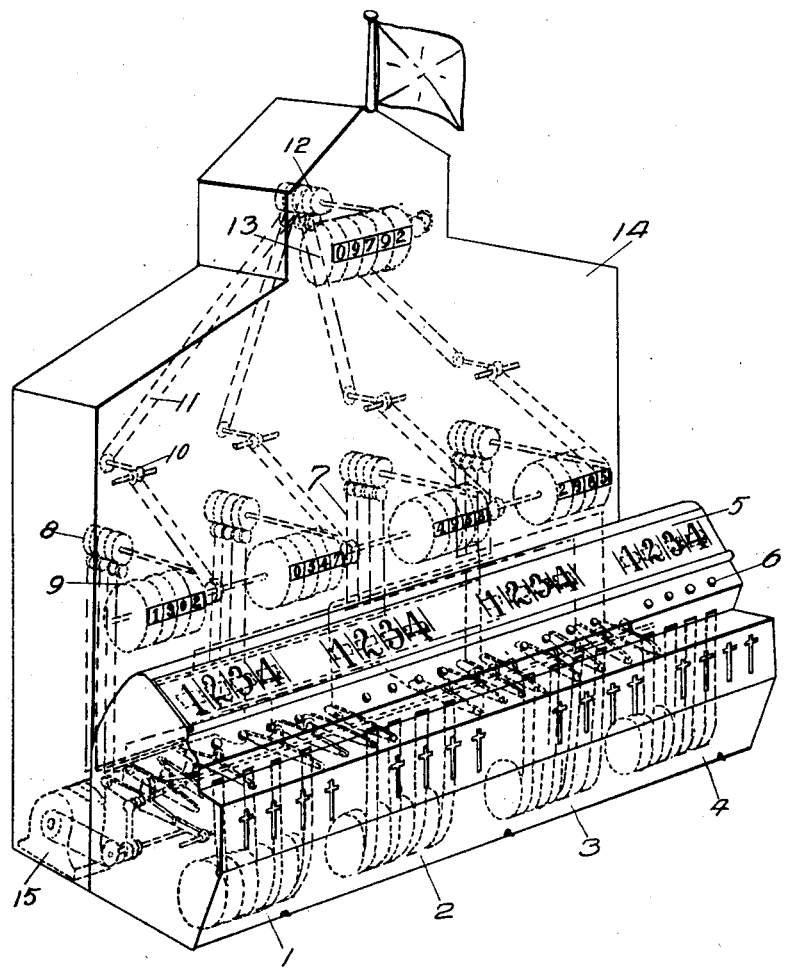

G. A. JULIUS.
APPARATUS FOR PRINTING AND ISSUING TICKETS OR CHECKS OF DIFFERENT DENOMINATIONS AND FOR REGISTERING AND TOTALING NUMBERS AND INDICATING THE TOTALS.
APPLICATION FILED AUG. 4, 1910.

1,082,957.

Patented Dec. 30, 1913.

13 SHEETS—SHEET 1.

G. A. JULIUS.
APPARATUS FOR PRINTING AND ISSUING TICKETS OR CHECKS OF DIFFERENT DENOMINATIONS AND FOR REGISTERING AND TOTALING NUMBERS AND INDICATING THE TOTALS.
APPLICATION FILED AUG. 4, 1910.

1,082,957.

Patented Dec. 30, 1913.
13 SHEETS—SHEET 4.

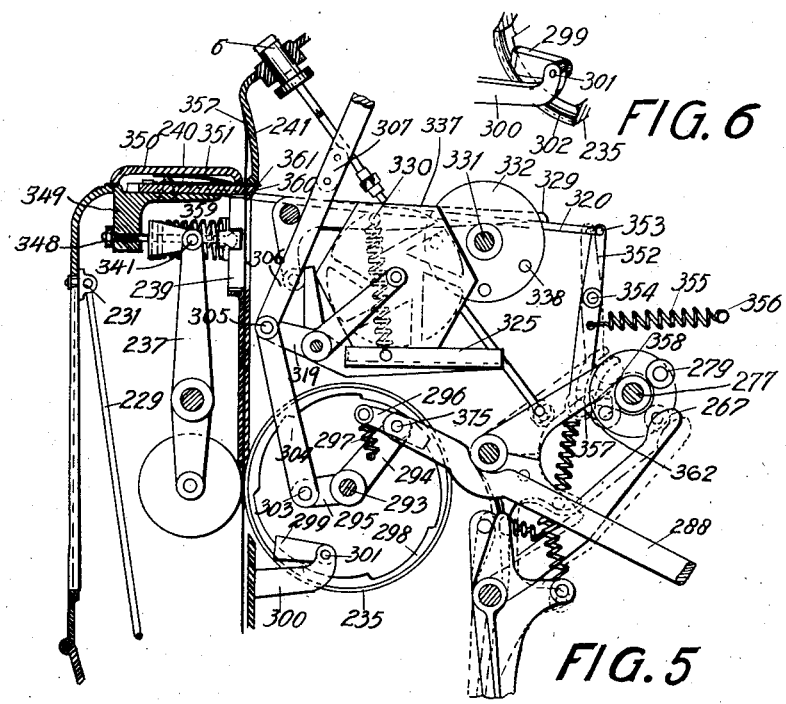
FIG. 6
FIG. 5
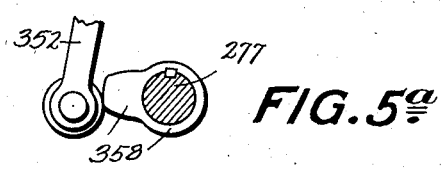
FIG. 5ᵃ

G. A. JULIUS.
APPARATUS FOR PRINTING AND ISSUING TICKETS OR CHECKS OF DIFFERENT DENOMINATIONS
AND FOR REGISTERING AND TOTALING NUMBERS AND INDICATING THE TOTALS.
APPLICATION FILED AUG. 4, 1910.

1,082,957.

Patented Dec. 30, 1913.
13 SHEETS—SHEET 6.

Witnesses.
Brennan B. West.
Oliver M. Kappler.

Inventor
George Alfred Julius.
By Baker, Fonts & Hull,
Attorneys

G. A. JULIUS.
APPARATUS FOR PRINTING AND ISSUING TICKETS OR CHECKS OF DIFFERENT DENOMINATIONS
AND FOR REGISTERING AND TOTALING NUMBERS AND INDICATING THE TOTALS.
APPLICATION FILED AUG. 4, 1910.

1,082,957.

Patented Dec. 30, 1913.

13 SHEETS—SHEET 7.

G. A. JULIUS.
APPARATUS FOR PRINTING AND ISSUING TICKETS OR CHECKS OF DIFFERENT DENOMINATIONS
AND FOR REGISTERING AND TOTALING NUMBERS AND INDICATING THE TOTALS.
APPLICATION FILED AUG. 4, 1910.
1,082,957.
Patented Dec. 30, 1913.
13 SHEETS—SHEET 8.
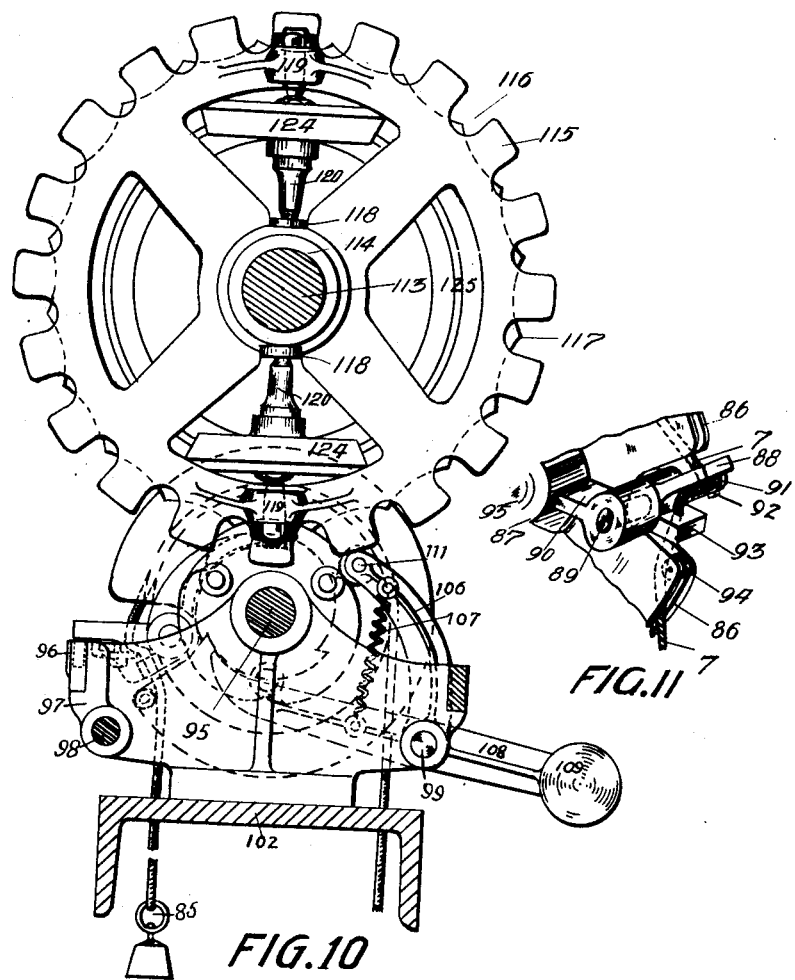

G. A. JULIUS.
APPARATUS FOR PRINTING AND ISSUING TICKETS OR CHECKS OF DIFFERENT DENOMINATIONS
AND FOR REGISTERING AND TOTALING NUMBERS AND INDICATING THE TOTALS.
APPLICATION FILED AUG. 4, 1910.

1,082,957.

Patented Dec. 30, 1913.

13 SHEETS—SHEET 9.

Witnesses

Inventor
George Alfred Julius.
By Baker, Foutz & Hull
Attorneys

G. A. JULIUS.
APPARATUS FOR PRINTING AND ISSUING TICKETS OR CHECKS OF DIFFERENT DENOMINATIONS
AND FOR REGISTERING AND TOTALING NUMBERS AND INDICATING THE TOTALS.
APPLICATION FILED AUG. 4, 1910.

1,082,957.

Patented Dec. 30, 1913.

13 SHEETS—SHEET 11.

Witnesses.
Brennan B. West.
Oliver M. Kappler.

Inventor
George Alfred Julius.
By Baker Jones & Hull
Attorneys

G. A. JULIUS.
APPARATUS FOR PRINTING AND ISSUING TICKETS OR CHECKS OF DIFFERENT DENOMINATIONS AND FOR REGISTERING AND TOTALING NUMBERS AND INDICATING THE TOTALS.
APPLICATION FILED AUG. 4, 1910.
1,082,957.
Patented Dec. 30, 1913.
13 SHEETS—SHEET 12.
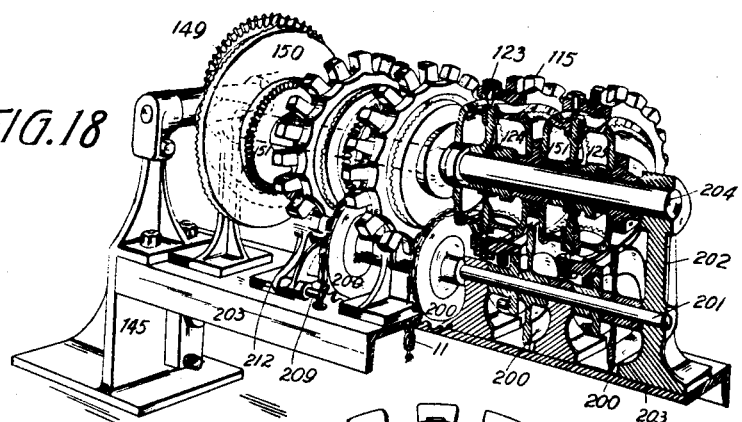
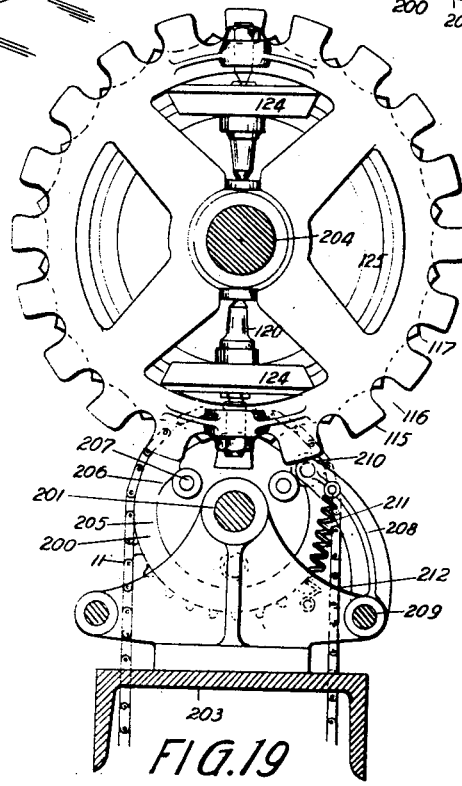

G. A. JULIUS.
APPARATUS FOR PRINTING AND ISSUING TICKETS OR CHECKS OF DIFFERENT DENOMINATIONS AND FOR REGISTERING AND TOTALING NUMBERS AND INDICATING THE TOTALS.
APPLICATION FILED AUG. 4, 1910.
1,082,957.
Patented Dec. 30, 1913.
13 SHEETS—SHEET 13.
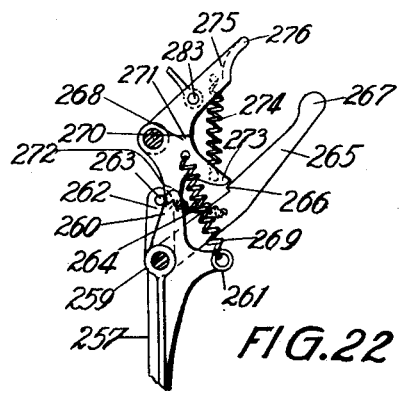
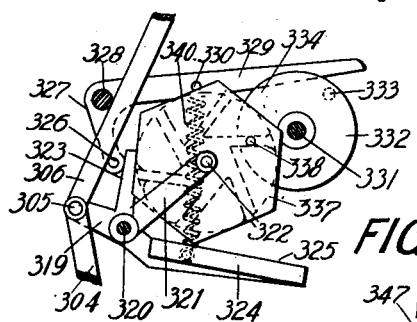
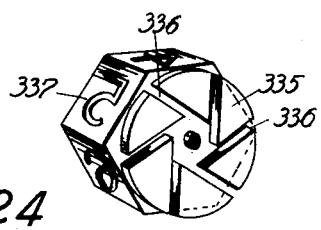
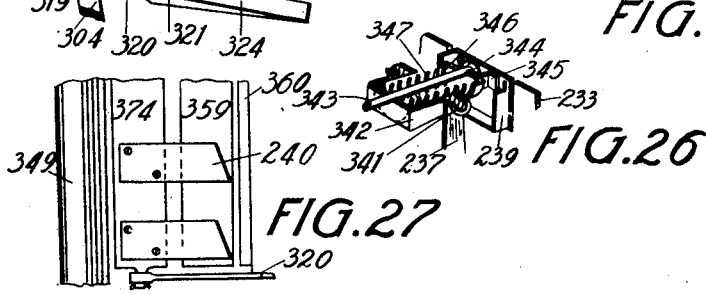
Witnesses
Brennan B. West
Oliver M. Kappler
Inventor
George Alfred Julius.
By Davis, Forty & Hill
Attorneys

UNITED STATES PATENT OFFICE.

GEORGE ALFRED JULIUS, OF WOOLLAHRA, NEAR SYDNEY, NEW SOUTH WALES, AUSTRALIA.

APPARATUS FOR PRINTING AND ISSUING TICKETS OR CHECKS OF DIFFERENT DENOMINATIONS AND FOR REGISTERING AND TOTALING NUMBERS AND INDICATING THE TOTALS.

1,082,957.      Specification of Letters Patent.      Patented Dec. 30, 1913.

Application filed August 4, 1910. Serial No. 575,520.

*To all whom it may concern:*

Be it known that I, GEORGE ALFRED JULIUS, subject of the King of Great Britain and Ireland, residing at Ocean street, Woollahra, near Sydney, in the State of New South Wales, Australia, have invented certain new and useful improvements in and relating to apparatus for printing and issuing tickets or checks of different denominations and for registering and totaling numbers and indicating the totals, of which the following is a specification.

This invention consists in mechanical apparatus for printing and issuing tickets or checks of different denominations and for registering, totaling and indicating separately the number of issues of the several denominations of such tickets or checks and the grand total of all issues thereof. The printing, numbering totaling, group totaling, grand totaling and indicating apparatus are severally constructed on the unit principle. The printing and issuing devices consist of separate units, any required number of which may be associated together in one case so that there may be issued from the one case tickets or checks of two or more different denominations. The computing and total indicating devices are also constructed on the unit principle, that is to say, a computer for any particular group contains a unit member or element for introducing into such computer the total of issues from any particular printing or issuing unit which is to be contained in the total to be ascertained by means of such computer. There may be any required number of issuing units and any required number of computing, registering and indicating units to suit the circumstances of any particular case, and these several units together make up a complete machine or a section of a complete machine. The computing and indicating mechanism is adapted for the grouping together of the totals of any number of issuing elements whether such elements be contained in one issuing case or in two or more separate issuing cases. The apparatus provides for the reckoning and indicating of a separate total for the issues from each and every element in the printing and issuing mechanisms, for the total issues from every case of such elements, for the total issues from all the units in any group of such elements, whether such several units be contained in the one case or in two or more separate cases, and for the grand total of all the issues. Independently of the ticket printing and issuing mechanism, my said apparatus is adapted for the totaling of numbers in separate sets or groups and for the indication of the totals of any number of such sets or groups. The printing and issuing mechanism may be used when required for issuing railroad and other tickets or certificates, and checks for payments and other purposes, and registering and indicating all the totals of issues separately, grouped, or in the aggregate, as before stated.

My invention includes also accessory parts and features in such apparatus for preventing and correcting errors due to mistakes or mismanagement by clerks, for facilitating the rapid resetting of the registering and indicating devices at zero, and for other purposes.

The printing and issuing mechanisms are illustrated in Figures 1 to 6 and in Figs. 22 to 27 of the accompanying drawings. Figs. 7 to 21 of those drawings relate to the computing and indicating mechanisms. In the latter mechanisms the counter and indicating devices are operated by the computer devices which latter each consists of a number of elements separately rotatable and driven primarily by connections from the printing and issuing elements.

Figure 2:
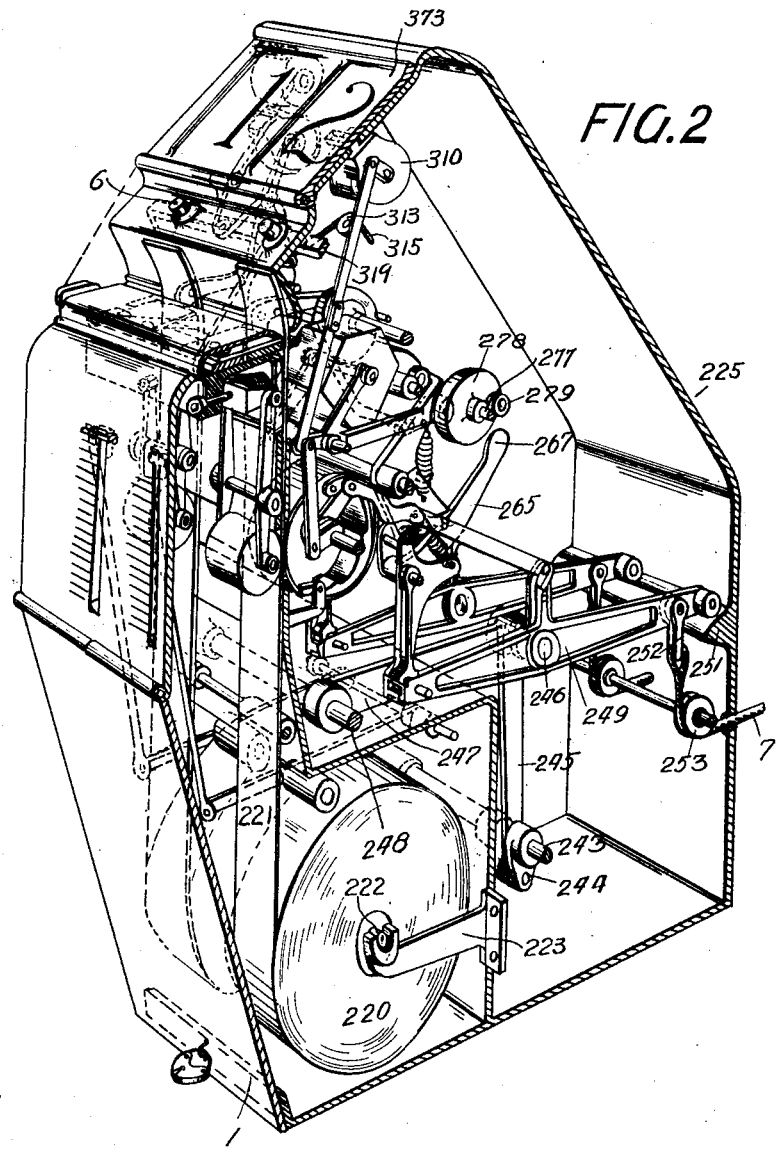
Figure 3:
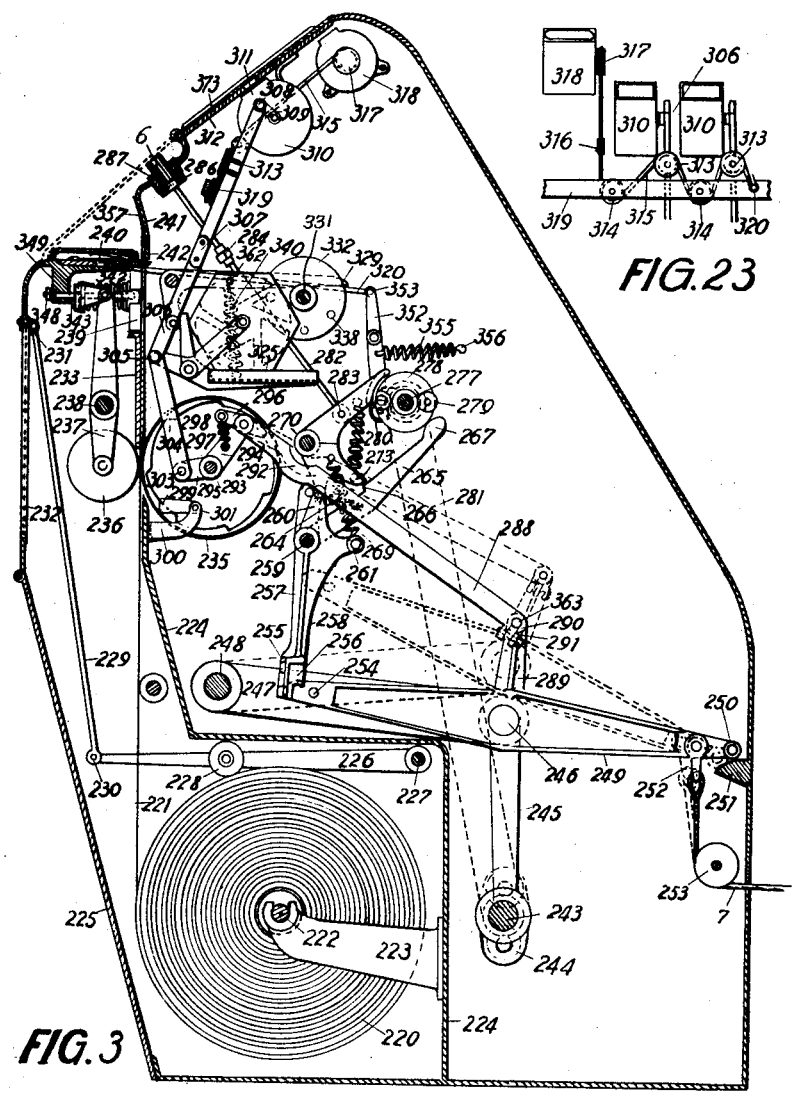
Figure 4:
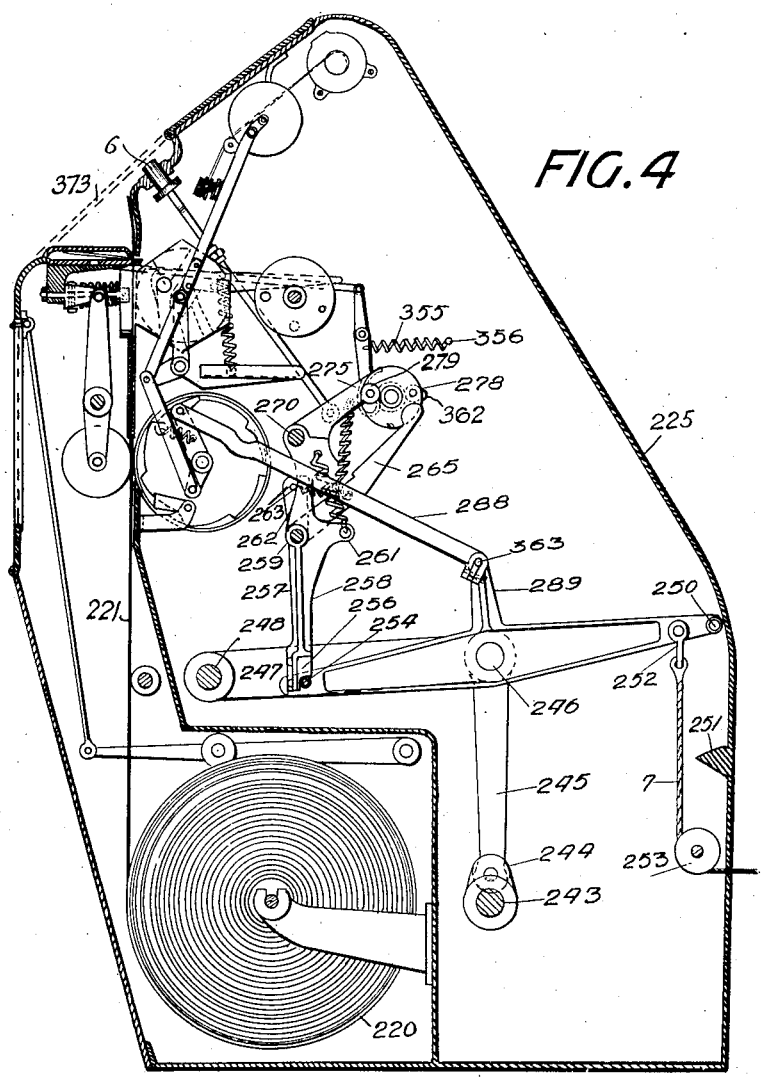
Figure 7:
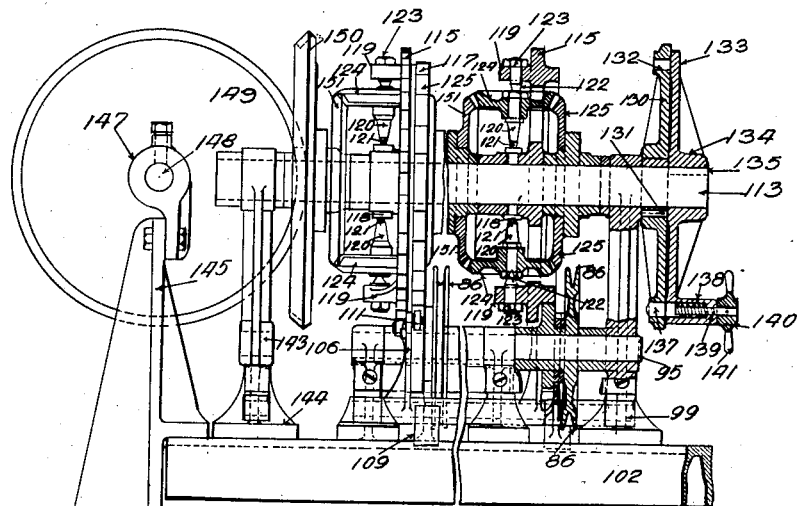
Figures 20, 21:
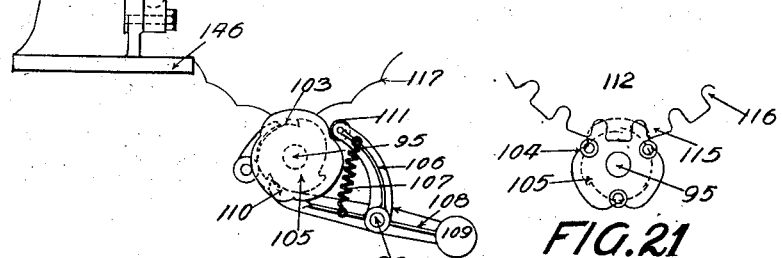
Figure 8:
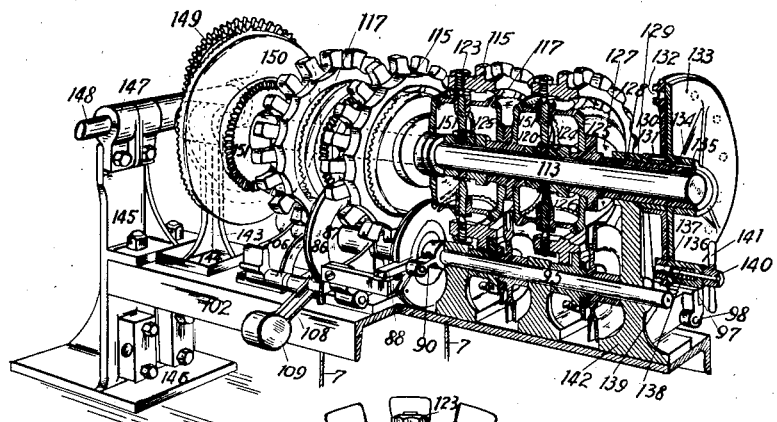
Figure 9:
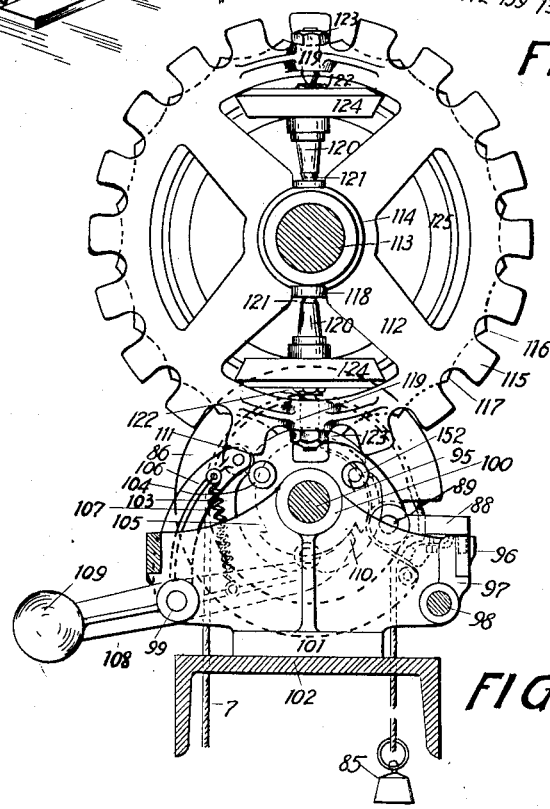
Figure 12:
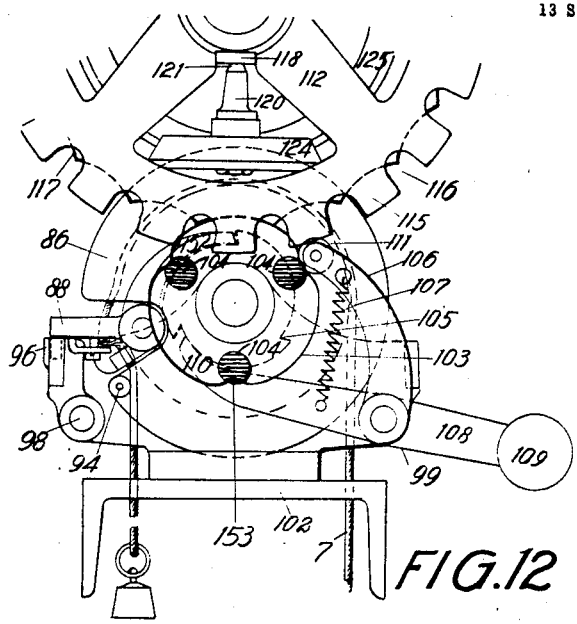
Figure 13:
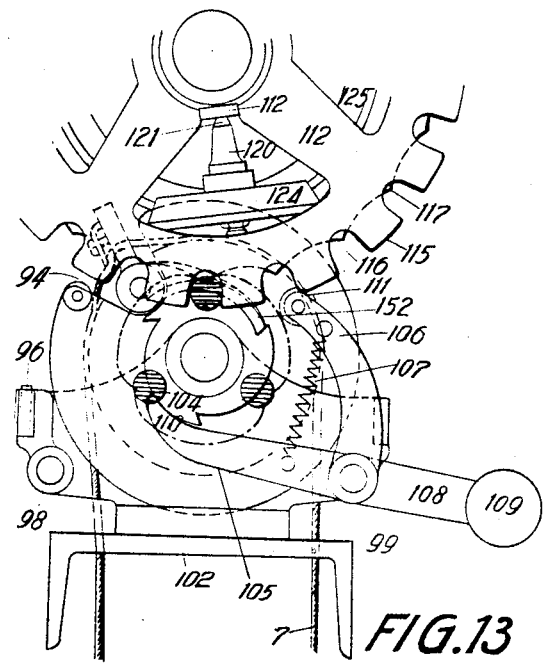
Figure 14:
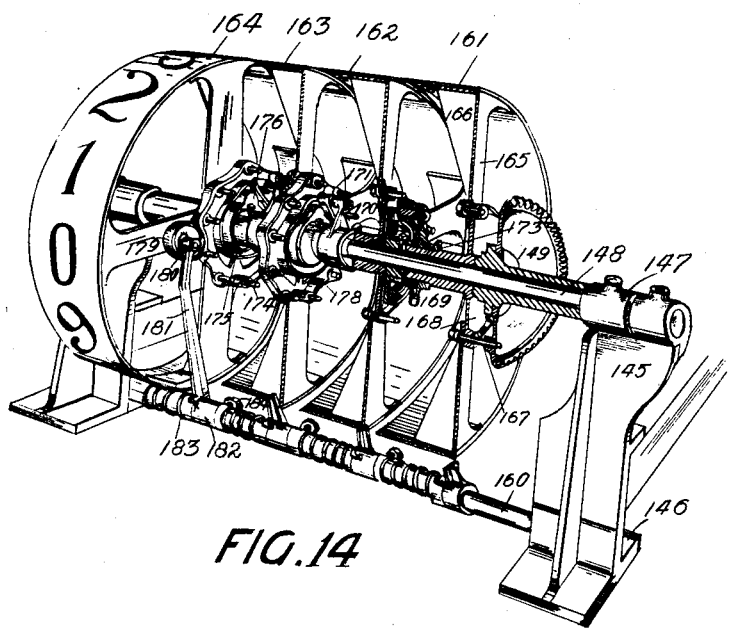
Figure 15:
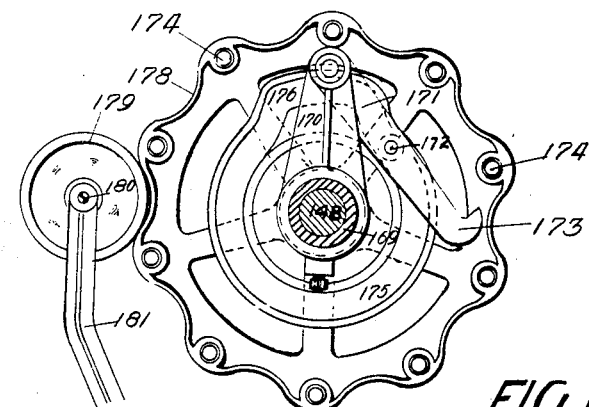
Figure 16:
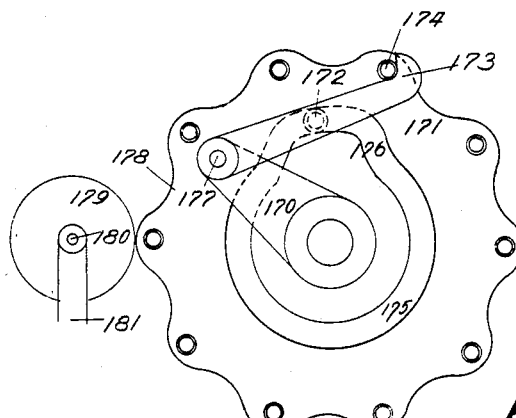
Figure 17:
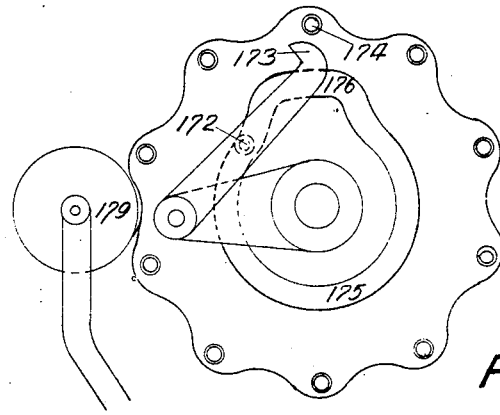

Fig. 1 is a diagrammatic view illustrating a convenient arrangement for the grouping of the printing and issuing mechanisms and the computing and indicating mechanisms. In this drawing is shown four printing and issuing cases set side by side, each of these fitted up for issuing tickets or checks of four different denominations. There are four group computers each consisting of four elements, and four counter-indicators for displaying the totals ascertained by the computers. These counters are connected mechanically to the four elements respectively of the grand total computer which operates the grand total counter-indicator. The four group computers relate respectively to the tickets of each of the four denominations issuable from each and all of the four cases. These cases severally contain separate counters for each denomination of ticket issued out of them respectively and they also each contain a grand total counter for the case. The indicating devices therefore comprise a total for each and every separate printing unit, a case total for each case of printing units, a group total for the aggregate of the tickets of each separate denomination, and a grand total of all the issues. Fig. 2 is a perspective view of a fragment of a printing case containing two printing and issuing elements. Fig. 3 is a sectional elevation of the parts comprising one printing and issuing element, but showing also the mechanical parts common to a complete case of such elements. This view is shown in the position in which the parts lie immediately after a ticket or check has been printed and issued, the ticket being shown standing in the delivery mouth in the act of being cut off. Fig. 4 is a similar view showing the apparatus in the position in which the parts lie during the operation of printing the ticket or check. Fig. 5 a fragment elevation on an enlarged scale showing the parts in the same position as they appear in Fig. 3. Fig. 5a is an enlarged side elevation of the cam which occupies the cut off mechanism. Fig. 6 is a fragment view of part of the paper feed barrel with a silent detent for preventing reverse movement. Fig. 7 a sectional elevation showing two elements of the "group computer" which is used for integrating the individual movements of each unit of a group of corresponding printing elements contained in different cases or sets, and showing also the mechanism for conveying the total of the movements so obtained to a "group" indicator, and mechanism for resetting the computer. Fig. 8 is a perspective sectional elevation of a group computer of four elements and accessory parts shown also in Fig. 7; Fig. 9 is an end view of one element of the group computer; Fig. 10 is an end view of a computer element next adjacent to the element shown in Fig. 9; in this view the parts move reversely in relation to the movements of the parts shown in Fig. 9. Fig. 11 detail perspective view on enlarged scale showing the pawl dog of one of the group computer elements. Figs. 12 and 13 outline fragment elevational view of the pawl and detent and the pin-and-star wheel and Geneva motion mechanism of the computer in idle and driving positions respectively. Fig. 14 perspective sectional elevational view of the drum counter-indicator used for exhibiting the group computer and aggregate computer totals. Figs. 15, 16 and 17 fragment detail and outline elevational views of the decimal progression mechanism of the counter-indicator. Fig. 18 sectional elevation perspective view of the aggregate computer (four elements), which is used to integrate the group totals to obtain the "grand total" of all the movements of individual elements in the printing mechanism. Fig. 19 an end elevational view of one of the elements in the aggregate computer. Fig. 20 fragment outline view of the star wheel portions of the Geneva motion parts by which the elements of the group computers are severally locked. Fig. 21 similar view illustrating the action of the pin wheel step by step motion parts by which an element of the group computer is advanced one step for every movement (one third rotation) of the Geneva cam. Fig. 22 is an enlarged view of the tripping mechanism for throwing the operative parts of the element into motion by moving one of those parts by means of a press button. Fig. 23 is a separate view indicating the means for transmitting to the total register for each case the sum of the individual movements of the several separate printing elements in such case. Fig. 24 an enlarged fragment view of the mechanism for actuating and setting the printing block and the inking pad. Fig. 25 a perspective view of the printing block. Fig. 26 a perspective section through the printing table and its spring seat and replacing gear. Fig. 27 a fragment plan indicating the construction of the cut off knives and the means for reciprocating the same.

In Fig. 7 are shown several cases of printing elements marked respectively 1, 2, 3 and 4. 5 are the unit registers which exhibit through apertures in the case the total movements of each element respectively. The panels in which these apertures are cut bear lettering or marking to indicate respectively to which denomination of ticket they refer. These indicators are marked in large characters 1, 2, 3 and 4 in Fig. 1. 6 are the press buttons for operating the triggers by which the printing elements are thrown into gear. 7 are the rope pull connections from the printing elements to the group computers 8. 9 are the group counter-indicators, one of which is associated respectively with each of the group computers 8. 10 and 11 represent fair lead chain and toothed gearing, the arrangement and connection of which is adapted to the particular circumstances of each case, for conveying the rotations of the counters 9 respectively to the elements of the grand total computer 12 which is connected to the grand total counter-indicator 13. 14 is a housing or casing inclosing the computing counting and group and grand totals indicating mechanism.

As shown in Figs. 2, 3 and 4, the movements of the printing and issuing elements or units are conveyed each by a separate rope 7 to an element in the group computer in which the movements of such elements or units respectively are required to be accounted for. These ropes are drawn by oscillating beams 249 at each operation of the printing unit; they are carried over fair lead sheaves 253 conveniently placed having regard to the location of the printing case in relation to the computers to which the printing elements are connected. 225 is a case inclosing any required number of printing and issuing units. This case carries at its ends a shaft 243 rotated continuously by an electric motor 15 or other source of power. From this shaft all the movements of the parts are derived, each unit being separately thrown into operative position so as to be moved from said shaft 243 by operating the trigger gear connected to the press button 6. A counter shaft 277 connected by chain and sprocket gear 281 to the main driving shaft 243 is contained within the case, its function being to convey motion to the trigger gear on which the press button 6 acts. The case also carries arbors 248 journaled at its ends. These arbors support arms 247 which have a vertical oscillating movement about them. The outer ends of these arms 247 are connected to the connecting rods 245, both these parts being eyed on the ends of a continuous spindle 246 on which spindle the several oscillating beams 249, one for each unit, are mounted so as to be capable of oscillation about the said spindle 246. The connecting rods 245 are moved by cranks 244 on the shaft 243. The arms 247 are continuously reciprocated as long as the shaft 243 is rotated, whether or not one or more of the printing units in the case is in operative action. When they are working idle the several parts move as shown in the full and dotted lines respectively in Fig. 3. When a unit is tripped into operative action by pressing its button 6 they still oscillate vertically, but tip the oscillating beams 249 so as to draw the cord 7 connected therewith as shown in Fig. 4.

For each printing unit a reel of stiff paper 220 is carried on a spindle 222 which is supported in brackets 223. A strip of paper 221 run off this reel is drawn between the casing plate 224 and the guide plate 233, (see Fig. 3). On the top of the reel there presses a roller 228 carried on an arm 226 pivoted at 227. The outer end of the arm 226 is pivotally connected at 230 to the indicator rod 229 which works the slide indicator 231 running in a slot 232 in the casing, exhibiting to the operator the quantity of paper remaining on the reel 220. As shown in Fig. 3 the reel is full and the indicator 231 is at top position. The paper strip passes between the feed roller 235 and a jockey roller 236. The roller 236 is carried on the lower end of the beam 237, which beam is supported on the dead spindle 238 which may run from end to end of the case and carry all the several beams 237. The upper end of the beam 237 is forked, or there may be two such beams one fitted to either side of the roller 236. These upper ends carry the trunnion pins 341 of the printing table 239, (see Figs. 5 and 26). This table is a metal stamping, which may be faced with rubber, fiber, or blanket in order to provide a resilient surface for the printing block 337 to act against. 342 is a pocket from which the trunnion pins 341 project. This pocket carries a spiral spring 347 in compression. The forward end of this spring acts in a cup 346 which presses against the pocket piece 345 which is fitted to the rear side of the printing table 239 and carries the head 344 of the guide rod 343. This guide rod works freely through a hole bored in the case lug 349 which forms a guide for it and it is fitted on its rear end with a nut 348 (Fig. 5) by adjusting which the limit of forward movement of the table 239 can be controlled (see Figs. 3 and 5). The spring 347 acts to push the upper ends of the levers or beams 237 outward, thereby pressing the roller 236 against the paper strips and nipping the same tightly between the said roller and the feed barrel 235. The spring 347 therefore performs the double function of holding up the printing table 239 to receive the impression of the printing block and at the same time maintaining a biting pressure on the paper strip 221 to prevent movement of the same during the printing and cutting off operations. Immediately above the printing table 239 is the knife rest 359, shown in Fig. 5. A throat bar 360 traverses the case in front of the knife rest 359, an aperture being left between those two parts to allow the paper strip to be passed up through same. There is a gap between the throat bar 360 and the lip 242 of the outwardly curved part 241 of the casing. Through this gap 361 the knives 240 pass after cutting through the paper strip. In Fig. 5 the strip of paper 357 which has been already printed and forms the ticket or card issued by the apparatus, is shown just cut off by the knife and standing upward in front of the curved plate 241. The curvature of that plate has the effect of pitching forward the card or ticket thus produced on to the cover tray 350. This cover tray secretes the knife mechanism but may be readily lifted for the purpose of adjusting the same. It may be made in separate sections for every unit or in one piece for a complete case. The knives 240 are beveled faced; one is provided for each unit, its width being ample to cut the ticket strip. These several knives are screwed to a reciprocating bar 374, as shown in Fig. 27. At their ends these bars 374 are connected by connecting rods 320 to the rocking levers 352 by a pin connection 353, (see Figs. 3 and 5). These levers 352 are reciprocated as indicated in the dotted lines in Fig. 5 after each printing operation, whereby the bars 374 and the knives 240 with them are vibrated transversely so that the knives pass through the gaps 361 and cut off the protruding ticket strips 357. The knives are kept down to the faces 359 by means of light plate springs 351 attached to the under side of the cover plate 350. The issuing mechanism may be completely locked for each case by the folding cover 373, the closed position of which is indicated by dotted lines in Fig. 3. As shown in the full lines in that figure it is lifted up to expose the press button and permit the issued tickets or checks to be withdrawn from the top of the cover plate 350 on to which they are delivered as before described.

The counter shaft 277 carries for each unit a disk 278. This disk carries on one side of it a pin and roller 279 and on the other side of it a pin and roller 362. The shaft 277 also carries a cam 358 at either end as shown in Fig. 5. These cams act against rollers 357 on the lower end of the knife vibrating levers 352. The pressure of these cams 358 against said rollers 357 throws these levers 352 outward in the position shown in Fig. 5 against the pull of the spring 355 (which is anchored to a pin 356 in the casing) thereby drawing on the cutting rods 320 and reciprocating the bars 374 and the cut off knives 340. The position of the cams 358 on the shaft 277 times the movement of the knives so that the cutting off action occurs immediately after the completion of the printing operation, the knives being meanwhile retired as shown in Fig. 3 to permit the paper strip 221 to be projected up through the gap between the knife guide 359 and the throat bar 360. The roller 279 acts on the knuckle end 267 of the lock lever 265 and the roller 362 acts against the hollow palm 276 on the end of the trigger 275. When the parts are located as shown in Fig. 3, the roller 362 holds the trigger 275 outward and prevents it being pressed inward by the press button 6 which is carried on the end of the rod 282. This rod is pin connected at 283 to the trigger 275 and is provided with a left and right hand nut 284 for bringing the parts into exact adjustment. When the roller 362 is located in contact with the curved end 276 of the trigger 275 it is impossible to force in the trigger by pressing the button 6. That position is shown in Fig. 3. When, however, the disk 278 has moved around sufficiently to clear the roller 362 the trigger 275 may be pressed inward as shown in Fig. 4. The rotation of the disk 278 brings the roller 279 once in every rotation of such disk in contact with the knuckle 267 of the lock lever 265 and it acts against such lock lever knuckle as a tappet. The effect of this tappet action is to throw the lock lever 265 outward so as to free the nose 273 of the sear 268 from the notch 266 of the lock lever, (see Fig. 22). This movement occurs upon the completion of a printing operation and has the effect of resetting all the parts. The sear 268 and the trigger 275 are carried on the arbor 270, around which they are freely rotatable. They make contact on the line 271, where one of them is thickened or offset to engage against the other. The effect is therefore that while the trigger may be thrown by a momentary pressure on the button 6 thereby setting the lock, and may be forced back to open position by the contact of the roller 362 with the trigger palm 276, the sear nose 273 will be held by the lock lever 265 and the sear will not return to the open position until the lock lever 265 is thrown by the roller 279 after the printing, cutting off, and registering movements have been completed. The spring 274 connects the nose 273 of the sear with the upper end of the trigger 275. An upward movement of the trigger in obedience to the tappet action of the roller 362 against its end 276 therefore strains on the spring 274 and has the effect of drawing the sear upward with the trigger unless the nose 273 of the sear should be engaged by the notch 266 of the lock lever 265. The sear is also connected by a spring 269 to an offset of the bridle lever 257 at 261. The point of connection of the spring 269 to the sear is so related to the arbor 270 that the spring 269 exercises very little effort on the sear in opposition to the spring 274 already described. The bridle 257 is formed with a curved face 258, rearward of which the fulcrum pin 254 of the oscillating lever 249 reciprocates freely as shown in Fig. 3 when the trigger is not thrown by pressing the button 6. At its lower end the bridle lever carries a jaw plate 256 in the mouth 255 of which the fulcrum pin 254 sits when the trigger is thrown as shown in Fig. 4. When the fulcrum pin 254 is thus caught in the jaw 256, the oscillating lever instead of oscillating about the shelf 251 upon which its rear end roller 250 normally rests when it is oscillating in the idle position, oscillates about the fulcrum pin 254, whereby once in every oscillation the computer rope 7 connected to it by the shackle 252 is drawn. In the idle position, therefore, the oscillating lever 249 is caused to move about its end 250 while in the locked position it oscillates about its other end 254. The bridle 257 is provided with an upward extension 260 which laterally overlaps a similar extension 272 on the rear part of the sear 268, as particularly shown in Fig. 22. Both these parts rest on the offset pin 263 which is carried by the jockey arm 262. The jockey arm 262, the bridle lever 257, and the lock lever 265 all move freely and independently of each other about the arbor 259. The jockey 262 is cross connected by means of a spring 264 with the lock lever 265. The tendency of this spring, which is made strong enough to overpower the spring 269, is to keep the jockey pin 263 hard pressed against the two horns 260 and 272 of the bridle lever and the sear respectively. The sear is therefore kept up to the position shown in Figs. 3 and 22 and the bridle lever 257 is held with its lower end free from risk of engagement with the fulcrum pin 254 of the oscillating lever 249. That is the normal position when the unit is not performing a printing operation.

When pressure is applied to the press button 6 and transmitted therefrom through the rod 282 to the trigger 275, the trigger is moved inward as soon as the roller 362 leaves its outer end 276 unsupported. The inward movement of the trigger 275 is conveyed through the contact faces 271 to the sear 268 and the nose 273 of the sear is thus pushed into the notch 266 of the lock lever 265. The spring 264 now snaps the lock lever 265 home, holding the notch 266 engaged over the nose 273 of the sear. The downward movement of the sear, in obedience to the pressure applied to the button 6, presses over the jockey pin 263, thereby leaving the back end 260 of the bridle lever 257 unsupported; thereupon the spring 269 acting upon the horn 261 of the bridle lever tips the bridle lever forward into the position shown in Fig. 4, in which position the fulcrum pin 254 of the oscillating lever enters the mouth 276 of said bridle lever at the commencement of the upward stroke. The rotation of the shafts 243 and 277 continuing, the roller 279 on the disk 278 comes in contact with the knuckle 267 of the lock lever 265. The position of the roller 279 on the disk 278 is so fixed in relation to the movements of the parts that this contact only occurs upon the completion of the printing, cutting off, and issuing operations, and while the roller 262 is acting against the palm 276 of the trigger 275 for the purpose of resetting the lock and pushing out the press button 285. When it occurs, the lock lever is thrown outward as shown by the dotted lines in Fig. 5, thereby disengaging the notch 266 from the sear nose 273, which happening, the sear is drawn upward by the spring 274 and by the pressure of the jockey pin 263 against it tail 272. The pressure of the jockey pin at the same time moves the bridle lever 257 on its arbor 259 and throws its lower end clear of the fulcrum pin 254 of the oscillating beam 249, thus leaving the parts restored to the open position shown in Fig. 3.

While the parts are in the idle position the oscillating lever 249 acted upon by the connecting rod 245 oscillates idly up and down as shown in Fig. 3. As its pin connection 246 to said connecting rod 245 is also the point of its connection to the arm 247 which moves about the center 248, its rear end has a little endwise movement on the step or shelf 251, as shown in Fig. 3. This endwise movement is of no consequence excepting in so far as it is a component movement with the vertical oscillating movement, both of which are resolved on the pin 363 which carries the feed bar 288 so that at said pin 363 the traverse is radial to the pin 375 and no movement is applied to the feed drum 235. The pin 363 is carried on the crank arm 289 of the oscillating lever 249. The feed rod is fitted to it by a jaw 290 filled with a throat piece 291 held by a pin or bolt as shown in Fig. 3. This construction is adopted in order to enable the feed rod 288 to be disengaged from the pin 363 readily. It is desirable to make the several elements contained in a printing case separately removable so that they may be readily replaced in the event of any breakage occurring which puts a unit out of working order. Certain parts, such as the oscillating lever 249, the counting mechanism, and the paper feed, need not be removable, as there is no reasonable risk of any breakage or disorganization of those parts. It is also necessary not to disturb the through shafts 243, 248, 277 and 331; consequently the construction and arrangement of the parts is such that all the operative mechanism of each unit may be separated at a few points and lifted out bodily, and a corresponding unit set inserted and connected up in its place readily.

When the fulcrum pin 254 is tripped by the bridle lever 257, the pin 363 describes a curve having a horizontal component and imparts an endwise reciprocation to the feed bar 288. The feed bar is shown joggled at 292 to clear the arbor 270 of the lock. The arbor 293 of the feed drum 235 carries upon it a bell crank, the arms of which are marked 294 and 295, as shown to the best advantage in Figs. 3 and 5. The end of the feed rod 288 is pivotally connected to the outer end of the arm 294 and on the same pin is carried a pawl 296 acted upon by a draw spring 297 to keep the pawl in engagement with the detents 298. The inner face of the drum 235 is formed with detents 298, the length of each detent face corresponding to the length of paper strip required to be moved for each printing. In other words the length of the detent faces 298 will be nearly the same as the lengths of the checks or tickets produced by the machine. The length of the crank arm 289 of the oscillating lever is also proportionated so as to impart to the feed rod 288 a sufficient movement to carry the pawl 296 completely over one pawl face at each reciprocation. On the inner face of a flange on the edge of the feed drum a groove 235 of triangular section is cut. A wedge pointed silent brake 299 hung on a pin 301 on a bracket 300 sits in this groove permitting free rotation of the feed roller in the go-ahead direction but checking it positively against any reverse movement when the feed bar is working the pawl forward to pick up another tooth of the detent. At each reciprocation, therefore, of the oscillating lever 249 during the time that its fulcrum pin 254 is engaged by the bridle, the feed rod 288 makes one complete reciprocation and moves the feed drum 235 ahead by one detent space, thereby feeding up one ticket length of paper strip 221 from the spool 220. The crank 295 is pin-connected at 303 to a rod 304 which in turn is pin-connected at 305 to the counter and printing devices respectively. To the counter it is connected by a rod 306 having a convenient breakable connection 307 to permit of its separation in order to allow of the removal of the unit without disturbing the counting mechanism. The rods 306 are respectively pin-connected to the spindle cranks 309 of the counters 310 to which they relate, the length of the arm 309 being so proportionated that for each movement of the feed drum the corresponding counter will be moved ahead one notch and display the addition of one digit to its total through the sight window 311 in the case. On each of the rods 306 is carried a small sheave 313. Similar sheaves 314 in zigzag order with the sheaves 313 are mounted on a transverse bar 319 extending the length of the case, as shown in Figs. 2, 3 and 23. A flexible cord 315 of inextensible material is connected at one end to the fixed pin 320 and at the other end to a ratchet barrel 317 on the case total counter 318, and is zigzagged as shown over and under the sheaves 313 and 314, fair lead sheaves such as 316 being used if necessary. The ratchet barrel 317 must be so constructed that it will put the case total counter 318 ahead by as many units as correspond to the length of pull of the cord 315. When each unit counter 310 is operated, its corresponding sheave 313 draws on the cord 315 a definite length thereby moving the ratchet gear 317 ahead one notch and putting the total counter 318 ahead one digit. If, however, two or more of the unit counters 310 should be in operation simultaneously, a corresponding greater length of the cord 315 is drawn on, and the ratchet gear 317 is put ahead two or more notches as the case may be, and the case total counter 318 advances accordingly by two or more digits. It is immaterial, therefore, how many of the units in a case may be in operation at the same time. A clerk in charge may, if the demand on him is heavy, operate on two or more of the press buttons 285 at the one time. If he does so, the corresponding two or more units in the case will come into action simultaneously and two or more tickets or checks will be printed or delivered simultaneously. At the same time the issues for each of the units will be registered correctly on the corresponding unit counters and the total will also be correctly conveyed to the case counter 318.

The upward movement of the connecting rod 304 throws the crank 319—321, which is carried on the arbor 320, as shown in Fig. 24. The same arbor carries a pan 324 which supports the inking pad 325, and this pan is provided with a toe piece 323 against which acts the offset pin 326 on the end of the arm 327 of the bell crank lever 329, which is pivotally mounted on the arbor 328. The arm 321 carries the spindle 322 of the printing block 337. The printing block as shown is hexagonal, but that particular form is not essential though it has certain advantages in relation to the special construction shown as will be hereinafter described. On each of its faces a printing face of metal or rubber is mounted. The matter contained on each of these faces respectively may be different. The object of making this difference is to enable the machine without any change of printing blocks to be adapted for printing any one of these distinct markings on a ticket or check issued therethrough and furthermore to enable the person in charge of the machine to alter the setting at a moment's notice of all the units in any particular case for the purpose of changing the marking applied thereby to tickets issued from such case. And it is of course obvious that the printing blocks need not all be set so as to print the same matter on the several tickets issued. Different matter may be provided on the plates applied to each face of the block, or if similar matter is used on the several blocks a different order of face may be presented in the case of the several units, so that No. 1 denomination of tickets will, say, be marked with No. 3 face of the block, No. 2 with No. 6 face of the block and so on according to any system or order which may be determined upon for the purposes of check or security.

On one side of each printing block is a disk 335 in which tangential grooves 336 are cut. The shaft 331 carries for each unit a disk 332 which has on one side of it an offset pin 338 adapted to slide in the grooves 336. On the other side of it it has two offset pins 333 and 334 which engage the underside of the bell crank lever 329 for a purpose hereinafter to be described. A spring 340 connects the lever 329 and the pan 324. As normally the lever 329 rests on the hub of the disk 332, the pan 324 is drawn upward by means of said spring 340 until the toe 323 rests against the offset pin 326 on the crank arm 327. The ink pan is therefore capable of moving downward against the resilient lift of the spring 340 so that when the ink block is pressed down against it there is a little flexibility for the purpose of insuring the satisfactory application of the ink pad to the printing face of the block. When the printing block is raised, however, the pan cannot follow it, because the toe 323 is checked against the stop pin 326. The reciprocation of the rod 304 turns the crank 319—321 about its arbor 320, thereby lifting the printing block bodily as shown in Fig. 24 and carrying it across and pressing it against the paper strip which rests on the printing table 239, causing it to print the paper lying on such table, as shown in Fig. 4. The table 239 as before described is blanketed or rubber faced to facilitate the making of a clear impression and it is capable of receding a little against the pressure of the spring 347. Efficient clear printing is thus obtained. The lever 329 carries an offset pin 330 adapted to slide in the grooves 336. Those grooves are therefore engageable alternately by the pin 338 on the disk 332 and by the offset pin 330 on the lever 329. When the printing blocks are lying on the ink pad as shown in Fig. 5, the grooves 336 are engaged only by the pin 330, the pin 338 being then retired as shown in Fig. 5. The pin 330 being a fixed point during the printing operation has the effect of turning the printing block as it is advanced, so that its inked face is moved around to the front and brought up square against the paper to be printed. In the reverse movement in which the printing block is retired, the pin 330 retaining its control of the block by still sliding in one of the grooves 336, brings that face of the block which has just effected the printing operation over by turning the block and resets it on the ink pad 325. At each movement, therefore, the printing block is set down resiliently on the ink pad and is inked sufficiently, and it is lifted therefrom, turned around through an angle of 90° or thereabout and brought up against the paper strip which is pressed against it by the elastic packing formed by the covering of the ink table and by the spring support 347 of the ink table.

When it is required to change the printing faces of the blocks 337, the turning of the shaft 331, carrying with it the several disks 332, effects the necessary movement in all the units contained in the case. Normally the pin 338 stands in the position shown in Fig. 5. By rotating the disk 332 by the clockwise movement of the shaft 331, the pin 338 is brought around and caused to enter one of the tangential grooves 336. At the same time the pins 333 and 334 on the other side of the disk 332 take against the under side of the lever 339 and raise it, thereby lifting its pin 330 out of the groove 336 in the printing block which it had previously engaged. The rotation of the shaft 331 continuing, the printing block is rotated on its spindle 322 through a portion of a turn. When the pin 338 is about to lift out of the end of the slot 336 which it has engaged, the pin 334 is allowing the lever 329 to drop again, and just before the exit of the pin 338, the pin 330 drops into the next groove 336, the roller being thus turned through one-sixth of a rotation. Another complete turn of the shaft 331 will have the effect of turning the printing block 337 through another one-sixth of a rotation and presenting its successive face, and so on, the pins 338 and 330 successively engaging the grooves 336, the former for the purpose of turning the block to a new position and the latter for the purpose of acting as a guide to keep the block working in the position at which it is set. This upward movement of the lever 329 has the effect of throwing its crank end 327 and the pin 326 thereon against the toe 323 of the ink pan carrier so that during the turning movement of the printing block the ink pad is retired as shown in Fig. 24 so as not to interfere with the movements of the other parts already described.

The computing and totaling devices receive primary motion from the ropes 7. Each printing unit in a case is connected by one of these ropes 7 to a unit in one of the group computers. The group computers each respectively integrate the total movements relating to similar checks or tickets issued out of any number of separate cases. Thus an installation might comprise, as indicated in Fig. 1, four cases each set up to issue four different kinds of tickets. Whether the number of cases be four, or more or less than four, all the ropes, representing white tickets for instance, issued from No. 1 unit in each case are led over fair lead pulleys each to an element in the No. 1 computer. This computer, therefore, contains as many elements as there are printing elements in the associated cases for printing No. 1 series, or white tickets. Similarly No. 2 computer is made up of a number of elements corresponding to the number of red, or No. 2 series of tickets; and so on through the series of all the different denominations of tickets provided for. The whole installation is designed upon a unit system, that is to say, that a case consists of a number of similar printing elements one for every separate kind of ticket to be issued from such case, and each computer contains a number of elements all similar in construction, one element for each and every separate printing element the movements of which are required to be contained in the total which the computer is required to add together; the grand computer 12 is similarly constructed on the unit principle, but contains as many elements as there are separate group computers or group counter-indicators. If for instance there were five different denominations of tickets to be issued, five group computers would be provided, and if it were necessary to provide nine cases each to be attended by a separate issuing clerk, each of whom could issue tickets of any one or all of such five different denominations, then each group computer would contain nine computing elements, and each case would contain five printing elements. For the sack of simplicity the computer is shown as consisting of four elements, and similarly the indicator is shown as consisting of four elements (thus providing for indication of group totals to 9,999); but it will be understood that every case and every computer may consist of any number of elements, two or more, as may be required.

There is a certain detail difference in construction between the computers shown in Figs. 7 and 8, but with the exception of this difference which will be now described the construction of these computers is the same throughout, and similar mechanical movements are used in the aggregate computer 12 also, which will be referred to in detail in a later part of this specification. In the computer shown in Fig. 7, the face plate 130 is keyed at 131 to the standard which forms the bearing for the shaft 113; the boss 134 of the resetting disk 133 is keyed to the shaft 113 by a key 135. Each computing element consists of a pair of crown bevel wheels freely rotatable on the shaft 113 and a pair of bevel pinions gearing therewith and carried by a pin-and-star wheel also freely rotatable on the shaft 113. The boss of the first bevel wheel 125 in the first unit of the computer is however keyed to the shaft 113. The resetting disk 133 is fitted with a crank for rotating it, which crank carries the key 137 which is held home in one of the holes 132 in the face plate 130 by means of a spring 138, a handpiece 141 being fixed to the stem 139 of the key 137 to enable said key to be withdrawn when it is desired to rotate the shaft 113. By rotating the shaft 113 and consequently the first bevel wheel 125, motion is transmitted therefrom through the series of units to the terminal bevel wheel 150, which gears into the bevel wheel 149 on the shaft 148 of the group counter-indicator. By rotating this shaft 113, therefore, the indicator may be turned backward or forward so as to bring it to zero, or to add or subtract one or more units from the count for the purpose of correcting any error made by an issuing clerk, such for instance as the double printing of a ticket and therefrom the registering of two numbers for one ticket, or the issuing of a ticket without printing or marking it. The control 140 would when necessary be provided with a suitable lock, so that the totals could only be changed by a person properly authorized for that purpose and provided with a key to free the lock.

In the case of the computer shown in Fig. 8, the face plate 130 is, as before, keyed at 131 to the bearing 129 which supports the shaft 113, but the boss 127 of the first element bevel wheel 125 is sleeved through the bearing 129 and is keyed directly at 135 to the resetting disk 133. Precisely the same action therefore occurs in both constructions.

Each one of the ropes 7 controls the movement of one element in the computer. The rope is carried through fair lead pulleys from the printing mechanism and over the oscillating sheave 86, which is provided with very deep flanges to prevent slipping off of the rope. These sheaves 86 run free on the shaft 95 which is carried in the base 142 of the bearings 129, the upper part of which bearings carry the shaft 113. Each sheave 86 is formed with a gap through its flanges in which the pawl dog 88 is located, (see Figs. 9 and 11). This dog forms the rear extension of the driving pawl 152 and is pivotally carried on a cross pin 89 which projects from one side of the sheave. The nipping plate 91 secured by a screw 92 serves to bite the rope and hold it firmly in the dog 88 and to prevent it running through the hole in the same. The fall of the rope is then reeved through the tail piece 93 of the clip 88 and is attached to a weight 85 or an equivalent spring to keep it constantly in tension.

A roller 94 is fitted between the sheave flanges below the dog gap to prevent the rope 7 from moving out of the sheave when the sheave is in the back position shown in Fig. 10. On one side of the sheave 86 is a triangular cam plate 103 (seen in Figs. 9, 20 and 23). The cam faces terminate in V-shaped concavities. Into these concavities there presses a roller 111 on the end of the press finger 106 which is pivotally carried on the horizontal pin 99 which is surmounted in the frame. There is also carried on this pin a lever 108 counter-balanced at 109 and formed with a pawl tooth end 110. The pawl tooth 110 engages the three toothed detent 105. A spring 107 is provided to pull the finger 106 and the pawl 110 toward the cam and detent wheels. The pawl 110 prevents the reversal of the triangular cam plate 103 while the roller 111 independently of the pawl and detent lock, brings the cam faces to center, holding them there without lost motion. The cam faces 103 engage the faces on the star wheel 117, forming therewith a Geneva stop motion. The star wheel 117 and the pin wheel 112 (which are riveted together to form in effect one wheel) carry the two oppositely set pinions 124, which with the bevel crown wheels 125 and 151, make an element of the computer. The three pins 104 which project from the side of the triangular cam plate 103 are positioned to gear with the tooth spaces 116 in the star-and-pin-wheel 112—117. The tooth 152 of the pawl dog 88 engages the three tooth detent wheel 105, which is rigidly attached to the triangular cam plate 103, but a little more clearance is allowed the pawl 110 than to the pawl 152. When the rope 7 is drawn by the movement of the printing element to which it is connected it cants the dog 88 and thereby throws its pawl 152 against the detent wheel 105. The further movement of the rope turns the sheave 86 on the shaft 95 and in doing so moves around the cam 103, by the engagement of the pawl 152 with the detent wheel 105, so as to free the pin-and-star wheel 112—117. At this position one of the pins 104 engages one of the tooth spaces 116 in the pin wheel 112 and moves that wheel forward one-twentieth of a rotation, whereupon the succeeding cam face 103 comes into engagement with the next bay in the star wheel 117, in which position it is again locked by means of the pawl 110 and the roller 111. At the conclusion of the printing operation, the rope 7 is returned by the action of the spring or weight 85, the sheave being thus oscillated back to the silent position. The cam wheel 103 and the attached detent wheel 105 are rotatable on the shaft 95 independently of the sheave 86, but rotation is imparted to them from said sheave by the pawl 152 which is thrown into engagement with the detent wheel 105 when a strain is put on the rope 7 and the dog 88 is turned on the pin 89 which carries it.

The star-and-pin wheels are twenty-toothed. Normally each of the elements of the computer are held fixed by the devices just described, that is to say that wheel or ring which carries the star wheel 117 and the pin wheel 112 form a carrier for the pinions 124 which are mounted on cone centers 121 and 122. When any one of these element rings is moved ahead one tooth, that is a twentieth of a revolution, and the right hand crown wheel is stationary, the left hand crown wheel is moved ahead one-tenth of a revolution. As in each element the left hand crown wheel of one is connected to the right hand crown wheel of the next one in series, the movement thus imparted to the left hand crown wheel of any one element is transmitted directly to the right hand crown wheel of the next element in order nearer the terminal wheel 150, and in that element the movement of the right hand crown wheel is transmitted to the left hand crown wheel through the intermediate pinions 124, and so on ultimately to the terminal bevel wheel 150, and thence to the bevel wheel 149 by which the shaft 148 of the indicator is rotated. It will be observed, therefore, that a movement imparted to any one element is transmitted through all the later consequent movements to the terminal wheel 150. This transmission is in no way interfered with if two or more of the elements should be put into motion at one and the same time, because the additive effect is produced and the sum of all the simultaneous motions will be transmitted to the terminal wheel 150 and thence to the computer. Owing to the fact that each of the star wheels is positively locked by the Geneva movement, the movement of any one star wheel must be transmitted correctly through all the crown wheels gearing through the intermediate pinions 124 carried by the star wheels. A rubber bumper 96 is provided in the frame 97 to form a seating for the pawl dog 88, in order that when the sheave 86 is reversed by the action of the spring or weight 85 to reset it at starting position, it will come to rest without shock. This bumper also serves to throw the pawl dog 88 into the engaging position with the toothed detent wheel 105, thereby rendering quite certain the operation of the triangular cam plate upon the next rotation of the sheave 86. It is obvious that every other sheave 86 must be set in the reverse position in order that all the movements due to the pulling of the ropes 7 by the printing mechanism will be resolved finally into motion in one direction on the shaft 148.

The counter-indicator (Figs. 14–17) consists of three or more spider drums with intermediate decimal movement mechanism. In the drawing (Fig. 14) four such drums are shown. The number of drums to be used in any particular case will depend upon the number of digits in the total required to be indicated. The hub of the bevel wheel 149 runs freely on the shaft 148 and is locked to the unit drum 161 by a pin connection 167 which may be made in the form of a spring bolt such as 137 shown in Fig. 8 and fitted with a retracting handle and spring as there shown. Every unit movement delivered to the bevel wheel 149 from the computer turns the drum 161 ahead so as to exhibit the next higher figure through a slotted sight hole plate which is provided to exhibit a line of the figures on the several drums and to hide from view all the other figures thereon, as in the case of an ordinary engine counter. When the unit drum 161 has made a complete rotation, the tens drum 162 is moved ahead by the decimal mechanism one-tenth of a rotation, and so on through all the drums in higher series.

The hubs of the several drums are all freely rotatable on the shaft 148, but the drums are kept from turning on the shaft, when operated through the decimal gearing, by means of the setting rollers 179 which are carried on the arms 181 which swing on the by-shaft 160 and are kept pressed into the bays of the star wheel 178 on the drum hub by means of springs 183. Any one of the drums may be rotated to bring it back to zero by turning it with sufficient force to force the salient edges of the star wheel past the roller 179 or by holding back the arm 181 carrying the roller 179 while the drum is being turned. The star wheels each carry ten crown pins 174 and the turning movement is effected by the engagement with one of these pins of the floating hook 173 on the end of the floating lever 171 which is pivotally carried at 177 on the end of an arm 170 projecting from the hub of the drum next earlier in the decimal series, see Figs. 15, 16 and 17. Between each of the star wheels is a disk keyed to the fixed shaft 148, having cut in the side of it a circular slot 175, having a D-shaped deformed part 176. In this slot 175—176, the pin 172 (fitted with a roller) carried on the floating hook 171 works. As the drum revolves, it carries with it the arm 170 and the floating hook 171 hanging on said arm by the pin 177. While the pin 172 attached to the floating hook 171 is moving in the circular part 175 of the slot, the hook point 173 will be held back from contact with the pins 174, but when the pin 172 enters the joggled or deformed part 176 of the slot, the hook is advanced as shown in Fig. 16 and picks up one of the pins 174 and drags the star wheel and with it the tens counter ahead one step. The dimensions of the joggled slot 176 are such that as soon as this unit movement has been transmitted to the tens counter the hook 173 will be released from the pin 174 (see Fig. 17). This release happens when the pin 172 passes back to the circular part of the slot 175. Meanwhile the roller 179 drops into a bay of the star wheel 178 steadying it and bringing it to center correctly if it should have been slightly under carried or over carried in the hooking movement just described. Fig. 15 shows the position of the parts when the hook is about to be advanced to engage one of the pins 174. Fig. 16 shows it in engagement with a pin and therefore carrying around the tens drum with the unit drum, and Fig. 17 shows the hook retired from the pin and the roller 179 set against the edge of the star wheel and holding it to even step. Similarly the tens drum is geared to the hundreds drum, and so on through the series.

The aggregate computer 12 is essentially the same in construction as the group computer already described, and corresponding parts are marked therein with similar figures for purposes of identification. In this case the face plate lock by which any error of movement in the computer may be corrected by turning it forward or back is not necessarily used, because that correction will be transmitted from the group computer to the aggregate computer. Certain other parts are also omitted. For the sheave 86 a sprocket wheel 200 is substituted, and this sprocket is driven by a sprocket chain 11 connected by mechanical drives as indicated at 10 in Fig. 1 to the wheel 149 on the unit end of the indicator. The cam and pin wheel engaging with the star and pin wheel is used to obtain the go-ahead movement of the units as in the case of the group computer, but the pawl and ratchet mechanism is entirely omitted, and the driving sprocket is brought to center to provide against lost movement and to correctly lock the star wheel by the Geneva action, by means of a roller 210 carried on the swinging bracket 208 which is pivoted on the pin 209 in the frame and kept pressed against the edge of the cam wheel by means of the spring 211, see Fig. 19. As in the case of the group computer every alternate chain connection 11 must be reversed in order that the final wheel 150 will always move in the same direction. The movements of the wheel 150 are transmitted through the bevel wheel 149 to the aggregate or grand total counter indicator which is identical in construction with the group computer indicator which has been described already with reference to Figs. 14 to 16.

The mode of operation for the issuing of a ticket is as follows:—Assuming that a ticket of the first denomination is required to be issued from the No. 1 booth, the attendant first opens up the booth by swinging up the cover 373, and then presses in the button 6. Meanwhile, the electric motor or other source of power is operated to put the shafts 243 and 277 in motion. When the roller contact 362 on the disk 278 has passed the palm 276 of the trigger 275, the finger pressure on the button 285 causes the trigger 275 to move inward, thereby pushing downward the sear 268, forcing its heel 272 against the pin 263 on the jockey 262 and thereby straining the spring 264. The spring 269 now draws the bridle lever 257 into the position shown in Fig. 4. The beam 249 being meantime in oscillation about its end 250 as shown in the dotted lines in Fig. 3, is tripped by the bridle lever, the offset pin 254 falling into the mouth 255 of the bridle lever. In the next upward movement of the oscillating beam 249, the oscillation occurs about the point 254, the rear end 250 of the beam being reciprocated so as to pull the rope 7 through which its motion is transmitted to the computing counting and indicating devices, the parts taking the position shown in Fig. 4. When the sear is pressed downward as described, its nose 273 is engaged by the check 266 of the lock lever 265, and the jockey 262 being thereby locked in the operative position, the bridle lever 257 is held by the spring 269. When the beam 249 is oscillating in the idle position as shown in Fig. 3, it conveys no motion to the feed, printing, computing, totaling or indicating devices. When, however, its motion is about the point 254, the pin 263 on its bell crank 289 forces the connecting link 288 forward, thereby retiring the pawl 296 and engaging the next detent in the paper feed barrel 235, as shown in Fig. 4. In the downward return motion of the beam 249 the link 288 is drawn into the position shown in Fig. 2, in reaching which position it draws the link 288 backward, thereby advancing the paper feed barrel 235 by the length of one of the detents therein. This feed movement is applied to the paper strip 221 which is thereby caused to be moved upward a distance equal to the length of one ticket. In the upward motion of the beam 249, the bell crank 294—295 is turned anti-clockwise, thereby drawing down the link 304 and operating the printing mechanism. The printing mechanism is operated by the downward movement of the arm 319 of the bell crank 319—321, whereby the arm 321 of the bell crank is caused to move forward about the center 320 and to advance the printing block 337 toward the part of the strip of paper which is lying over the printing table 239. In this forward motion of the printing block, it is partially turned by the offset pin 330 which stands in one of the tangential slots 336. This turning movement brings the face of the printing block which has been inked by contact with the pad 325 toward the paper strip. The same downward movement of the link 304 which causes this turning and advancing movement of the printing block is conveyed through the link 306 to the operating lever of the unit counter 310; that counter is moved ahead one unit while the printing block 337 is being advanced to make contact with the strip of paper 221 overlying the printing table 239. The sheave 313 on the link 306 is drawn downward in the movement of advancing the unit counter one notch. When it is so drawn downward, the ratchet barrel 317 takes up the slack of the zigzag cord 315. When in the next movement (retiring the printing block) the links 304 and 306 move upward, the sheave 313 again bends the line 315, thereby drawing down its end which is wound on the ratchet 317 and the case counter 318 is thus moved ahead one notch. In the same downward movement the printing block 337 is retired, partly turned, and replaced on the ink pad 325.

All these several movements take place during one rotation of the disk 278, the printing movement occurring before the paper feed movement so that the end of the paper strip 221 lying over the printing table is printed and recorded by the counter 310 and by the counters which receive motion through the ropes 7 ready for delivery, and is delivered simultaneously with the retiring of the printing block. When the disk 278 has completed its rotation, its roller contact 279 engages the knuckle 267 on the lock lever 265, pushing that lever backward so as to free the nose of the sear 273 from the check 266. Immediately thereafter the roller contact 362 enters under the palm 276 of the trigger 275 and forces back the press button 6. The sear being thus freed falls back to the idle position shown in Fig. 3, in which position the jockey 262 being drawn backward by the spring 264, acts through its pin 263 on the heel 260 of the bridle lever 257, restoring that lever to idle position shown in Fig. 3, and leaving the oscillating beam 249 free to move idly as shown in the dotted positions in Fig. 3.

It has been already explained that when the oscillating lever 249 is tripped by the bridle 257, its rear end 250 is reciprocated vertically, thereby drawing the rope 7. The rope is thus drawn a fixed distance once and immediately restored to its idle position every time the printing block 337 is advanced to print a ticket. That distance corresponds with, but is a little in excess of one-third of the circumference of the sheave 86 over which said rope works. When the rope is drawn the dog 87 is first raised, causing the dog pawl 152 to move inward and engage one of the detents 105 on the side of the triple cam 103. The continued movement of the rope after this engagement rotates the sheave bodily for about one-third of a rotation and as the sheave 86 is engaged by the dog pawl 152 to the triple cam 103 that cam is moved one-third of a rotation, whereby it is made to clear the star wheel 117 while one of the offset pins 104 engages one of the bays 116 of the pin wheel 112 and the pin-and-star wheel is thus moved ahead one tooth. The cam 103 is irreversible, being locked by the pawl 110. When the pull on the rope 7 is released, the counterweight 85 draws the rope backward, restoring the sheave 86 and carrying back the pawl dog 88 on to the seating 96 as shown in Fig. 12. The cam faces 103 are brought to register in proper position against the star wheel 117 by means of the jockey roller 111 which is pressed into one of the bays of the cam wheel by the action of the spring 107 pulling on its carrying arm 106. For each movement of the printing mechanism, therefore, the connected cam acting on one of the pin-and-star wheels in the epicyclic computing mechanism is advanced one tooth. The doubling member in the particular train to which this motion is applied is thereby caused to make one-twentieth of a rotation around the shaft 113. As the bevel wheel 125 in each train is immovably fixed to the bevel 151 in the train preceding it, the moving of the doubling element in every train therefore advances one-tenth of a revolution the other bevel wheel 151 in that train. The movement of that bevel 151 is transmitted through all the trains higher in series being ultimately conveyed therethrough to the bevel wheel 150 and thence through the bevel wheel 149 to the shaft 148. If any error should occur in the issuing of the tickets, that error can be corrected by unlocking and turning the member 133, by which the bevel wheel 125 in the first epicyclic train is moved in either direction and the correction thus made transmitted through all the succeeding trains to the shaft 148. The motion of the shaft 148 is applied directly to the first drum 161 of the counter indicator shown in Fig. 4, one-tenth of a revolution being imparted to said drum 161 for every movement of the printing mechanism transmitted through the rope 7 to the computing gear and thence to said drum 161. When the drum 161 has completed one revolution, the hook 173 which is carried around by it is raised in passing through the part 176 of the fixed slot 175 and thereby caused to engage one of the offset pins 174 on the next decimal drum 162, moving said drum ahead one-tenth of a revolution, and so on through the whole series. The total of all the movements of any number of printing mechanisms may thus be communicated through a train of epicyclic gears to a single counter of the type shown in Fig. 14. There may be therefore an indefinite number of booths in which tickets of the same denomination are issued, so long as there is provided a computing mechanism having an epicyclic train for each and every of such booths and one counter registering the total movements applied to such train of epicyclic gears. The movements of the shaft 148 are further transmitted to an aggregate or grand totaling mechanism. If, for instance, there were ten group computers, in order that ten several denominations of tickets might be issued, there would be ten counters such as shown in Fig. 14, and from the shaft 148 of each of those counters a chain connection 11 would be led to an epicyclic train in a grand computer of the type shown in Figs. 18 and 19. This computer works on the same general principle as the group computer already described, but as the movement imparted to the chain 11 is always of the one direction the feed mechanism may be of a simpler type. In this case sprockets 200 may be used to carry the chains 11. These sprockets have fixed to them triple cams with offset pins 207 engaging the pin-and-star wheels which carry the doubling elements of the associated epicyclic train. The cams do not need a non-reversing pawl check; it suffices if they are provided with means for holding them in register, such means consisting of a roller 210 carried on a swinging bracket 208 and maintained in contact with the cam face of the spring 211. The bevel wheel 149 forming the terminal of this train is connected to the unit member of an aggregate counter constructed precisely identical with the group counter shown in Fig. 14.

Obviously, the paper feed and printing mechanism may be omitted and the apparatus then used for recording manual movements applied to the press buttons. And it is also obvious that if the paper feed mechanism be omitted, tickets may be separately inserted on the printing table and printed by the printing mechanism operating as already described.

What I claim as my invention and desire to secure by Letters Patent is:—

1. In combination, a plurality of ticket printing devices, each comprising a printing block and a printing table, a plurality of paper feed devices each comprising a pair of rollers to which step-by-step motion is imparted, paper strips passing between said rollers, and for each of said devices an oscillating element and mechanism for applying motion thereto, connections from said oscillating element conveying motion therefrom to the paper feed and printing devices, a bridle for holding said oscillating element in the operative position, lock mechanism manually controlled for engaging and disengaging the bridle and the oscillating element, a connection from the oscillating element to one element in a group computer, a group counter actuated by said computer and conveying its motion to an element in an aggregate computer, an aggregate counter actuated by the aggregate computer, and a counter and a connection thereto from the printing device.

2. In apparatus for the purpose set forth, a case having slots and a curved portion adjacent to said slots combined within the case, comprising paper strip rollers in the lower front portion of said case, feeding devices whereby the paper strips are moved vertically upward through said slots and against said upwardly curved backing whereby the cut-off printed strips are ejected forward, press-buttons controlling such mechanism located above the ejecting strips, counters directly respectively above said press-buttons, computing mechanism and flexible connections from the operative parts of said mechanism in said case for conveying motion therefrom to said computing devices.

3. The combination, with a vertically reciprocating pin 246 and means for reciprocating the same, of an oscillating beam 249 centered on said pin and having an arm, a device for latching one end of said beam, mechanism for registering the oscillations of said beam while the latch is engaged, a connection between the other end of said beam and said mechanism, a paper strip, mechanism for printing said strip, mechanism for operating said printing mechanism while said tripping device and beam are engaged, a step by step feeding device engaged with said paper strip, and a link connection 288 from said arm to said feeding device whereby said paper strip will be advanced subsequent to the operation of said printing mechanism.

4. The combination, with a pair of gear rotating shafts 243, and 277, shaft 243 having a crank, of a beam, connections between said beam and crank whereby said beam will be oscillated as said crank revolves, a disk 278 keyed to the shaft 277 and having contacts 279 and 362, a trigger 275 adapted to be engaged with one of said contacts, a stationary pin 270 upon which said trigger is mounted, a press-button 6 connected to said trigger, a sear 268 mounted on said pin 270, a spring 274 operatively connected to said sear, a lock lever 265 adapted to be engaged by the other of said disk contacts and to engage the nose of said sear, an ejecting arm 262 having a pin 263, a bridle 257 having a jaw 256 adapted to engage one end of said beam, said sear and said bridle having heels taking against said jockey pin, and springs connected to said bridle and to said jockey arm, substantially as described.

5. The combination, with a pawl and detent paper feed device, of a link 304 connected to said pawl, bell-cranks 319—321 articulated to said link 304, a rotatable polygonal printing block 337 journaled to said bell-cranks and having tangential slots 336 in the interior thereof, a positioned control pin 338 engageable in any one of said slots, a yielding printing table 239 adjacent to said printing block, an inking pad adjacent to said printing block, said paper feed device being so disposed with reference to said printing table, that a paper strip will be fed thereby between said printing table and said printing block.

6. The combination of a slotted guideway adapted for the reception of a paper strip, a printing table 239 adjacent to the rear face of said paper strip, a pivoted beam at the rear of said paper strip and having one end adjacent to said printing table, a spring between said table and said beam, a jockey roller carried by the other end of said beam and resting against said paper strip, a throat-bar 360 adjacent to said paper strip, a knife 240 slidable across said throat-bar, a cover plate 350 for said knife, a spring 351 coöperating with said knife and interlocking mechanism for operating said knife and for advancing said paper strip alternately.

7. The combination, with a polygonal printing block 337 any one of the faces of which is movable to the printing position, said block having tangential slots 336 in the end thereof, of a shaft 331 adjacent to said block, a disk 332 carried by said shaft and provided with offset pins 333, 334, and 338, where the pin 338 is engageable with said tangential slots, a spring retrieved lever 329 adapted to be engaged by the pins 333 and 334 and itself carrying an offset pin 330 also engageable in said slots, and a spring-borne ink pad 325 adjacent to said printing block, and connections between said ink pad and the lever 329 whereby said pad is moved toward and from said block.

8. The combination of rotating elements, a lock portion mutually operable at one period during the rotation of said elements, a bridle thrown by said lock mechanism when so operated, an oscillating beam engaged at one end by said bridle when thrown, mechanism for retarding the movement of said bridle, a connection from the other end of said oscillating beam to said mechanism, a step by step paper feed mechanism, a printing block adapted to operate against said paper, operative connections between said beam and said paper feed and printing mechanisms, and means operable subsequent to the operation of said printing and paper feed mechanisms for cutting off printed portions of said paper.

9. In a device of the character described, in combination, a power driven, continuously oscillating beam, a bridle adapted to engage said beam to latch the same, paper printing and paper feeding devices operatively connected to said beam and arranged to be actuated when said beam is latched, counting and totaling apparatus connected to said beam and adapted to be operated simultaneously with said printing and feeding devices, a locking device associated with said bridle, a press-button connected to said lock and bridle at a predetermined phase of the oscillation of said beam, and means for resetting said lock, substantially as described.

10. In a computing device of the character described, the combination of a ticket issuing mechanism, a fixed shaft, a plurality of epicyclic trains in connected series rotatable thereon, pin-and-star wheels carrying the floating pinions in each of said trains, said trains being connected with the ticket issuing mechanism to receive impulses therefrom, a manual device with lock for turning the first wheel in the train, gearing for transmitting motion from the last wheel in the train to a decimal counter, Geneva movements rotatable on the fixed shaft 95 and gearing with each of said pin-and-star wheels, loose pulleys on said shaft 95, counterweighted ropes passing over said loose pulleys, through which ropes oscillating motion is applied to said pulleys, and pawl clutches and reverse preventing devices between said pulleys and the Geneva motions.

11. In a computing device of the character described, the combination, with a ticket issuing mechanism, of a mechanism for transmitting motion to a pin-and-star wheel carrier for the doubling element in an epicyclic train, consisting of a pulley loosely rotatable in either direction on a shaft, a rope fixed to and passing over said pulley and oscillating the same when reciprocated, reciprocating means for said rope actuated by said ticket issuing mechanism, pawls mounted on said pulley acting against detents on a cam wheel the salient faces of which engage the bays of the star wheel, a holding device for said cam wheel consisting of a roller borne against the concavities thereof by means of a spring, and lateral pins on said cam wheel engageable with the bays of the pin wheel.

12. In an apparatus for the purposes set forth, the combination of a fixed shaft, a decimal counting and indicating device, consisting of a plurality of drums or barrels freely rotatable in juxtaposition thereon, means for advancing the drum lowest in series one-tenth of a rotation by each impulse applied thereto, an arm keyed on the hub of said drum, a hook pivotally hung on the end of said arm, an offset pin on the said hook, a member fixed to said shaft having a cam groove in which said pin moves, a pin wheel attached to the hub of the next wheel in series having its pins offset and engageable with said hook when same is raised by the cams, and a star wheel and catch roller device for holding said pin wheel in register between successive movements thereof.

13. In a device of the character described, the combination of a ticket issuing mechanism, means for transmitting decimal motion to a number of wheels in series, consisting of pin wheels on each of said wheels, fixed cam grooves between each of said wheels, a hanging hook traversed by each wheel and when raised engaging the offset pins of the next succeeding wheel, and an offset pin on said hook traversing the fixed cam groove and raised thereby during one-tenth of a revolution into engagement with one of the pins on its co-acting pin wheel.

14. In an apparatus for the purpose set forth, the combination of a number of separate mechanisms and means for summing the movement of such separate mechanisms, consisting of a series of epicyclic trains in which the first member is fixed and the following members rotatable and the sum of the rotation is applied to such last member, pin-and-star wheels carrying respectively each of the floating pinions in said epicyclic trains, Geneva cam-and-pin wheels gearing with such star-and-pin wheels, a spring advanced roller setting in the concavities of the cam wheel to hold the same locked in register, and a wheel rotated by gearing attached to said cam and pin wheel and applying motion thereto.

15. In combination a plurality of ticket printing devices each consisting of a printing block and a printing table, unit counters operated by the movements of said printing devices respectively, an oscillating element associated with each printing unit, a reciprocating mechanism by which motion is applied to said printing devices, mechanism manually controlled for engaging each said oscillating element and printing device to said reciprocating mechanism, a connection from said oscillating element to an element in a group total computer, a decimal counter actuated by said computer, an aggregate computer the elements of which are respectively operated by the movements of the group counters, and an aggregate counter actuated by said aggregate computer, substantially as described.

16. In apparatus for the purposes set forth a case containing in the front portion thereof the inwardly movable platen of the printing devices directly above the same respectively, unit counters indicating the separate movements of the printing devices in the case, at the foot of the case a pedal for applying motion to the operative elements within the case, and rope connections from said operative elements to computing devices located distant from said case, substantially as described.

17. In a device of the character described, a ticket issuing mechanism, a gang of epicyclic trains having separately moving elements connected in series; mechanism for summing the motions of a plurality of such separately moving elements the first wheel being fixed and the final wheel receiving the sum of the several motions, in combination with mechanisms severally operated by connections from said moving elements respectively and applying their movements to the several epicyclic trains respectively.

18. The combination with a plurality of devices to which manual movements may be applied severally for the purpose of recording the issue of tickets, of mechanism for summing said movements, said mechanism consisting of a plurality of epicyclic trains in series one for each said devices, in which epicyclic mechanism the first wheel is fixed and the final wheel receives the sum of the several motions, and motion transferring devices severally receiving motion from the recording devices and applying said motions to the several epicyclic trains respectively.

19. A computing device consisting of a plurality of epicyclic elements each movable individually by an independent connection and together transmitting the aggregate of the applied impulses to the final element of the series, each of said computing elements consisting of a pair of separable revoluble coaxial gear wheels, a rotatable member coaxial with said gear wheels, means for advancing said rotatable member by steps of eighteen degrees upon the application to such means of the impulses to be totaled, and for locking said rotatable member against movement between successive impulses, the neighboring gear wheels of contiguous pairs being connected together for simultaneous rotation, and a mutually adjustable member secured to the first gear wheel of the series.

20. In a device of the character described, in combination, a plurality of pairs of bevel gears rigidly connected together back to back, said pairs being independently rotatable about a common axis, a rotatable member mounted between the contiguous bevel gears of adjacent pairs and concentric therewith, bevel pinions journaled radially of each of said rotatable members and meshing with both of said bevel gears, means associated with each of said rotatable members and adapted to rotate the same through an arc of eighteen degrees upon the application thereto of the impulse to be recorded, said means being arranged so as to rotate adjacent members in opposite directions, a mutually adjustable bevel gear at one end of said series and meshing with the pinions carried by the first of said members, an independently rotatable bevel gear at the other end of said series and meshing with the pinions carried by the last of said members, and recording means connected to said last bevel gear.

21. In a computing device, the combination of a plurality of separate computing elements, mechanism for independently actuating each element, mechanism for carrying motion from one element to another, a separate station for recording impulses delivered to them from the computing elements, connections between each of said elements and said separate station, said computing elements being arranged to transfer to the next higher element impulses which are imparted directly to themselves and also impulses which are delivered to them from preceding elements, said transfer being independent of whether such impartation and delivery is successive or simultaneous.

In testimony whereof I affix my signature in presence of two witnesses.

GEORGE ALFRED JULIUS.

Witnesses:
 ALEX. J. GIBSON,
 S. HENRY BARRACLOUGH.